Aug. 3, 1954 — L. R. BUCKENDALE — 2,685,479
TUBULAR AXLE BEAM
Filed Nov. 25, 1944 — 2 Sheets-Sheet 1

INVENTOR.
L. R. BUCKENDALE
BY Strauch & Hoffman
ATTORNEYS.

Aug. 3, 1954

L. R. BUCKENDALE 2,685,479

TUBULAR AXLE BEAM

Filed Nov. 25, 1944

INVENTOR.
L. R. BUCKENDALE
BY Strauch & Hoffman
ATTORNEYS.

Patented Aug. 3, 1954

2,685,479

UNITED STATES PATENT OFFICE 2,685,479

TUBULAR AXLE BEAM

Lawrence R. Buckendale, Detroit, Mich., assignor, by mesne assignments, to Rockwell Spring and Axle Company, Coraopolis, Pa., a corporation of Pennsylvania Application November 25, 1944, Serial No. 565,109

6 Claims. (Cl. 301—124)

This invention relates to improvements in tubular axle beams and to methods of manufacturing the same, and more particularly to tubular trailer and other non-driving axle beams and methods of making them. In the past, when manufacturing non-driving and trailer axle beams, it has been proposed to utilize seamless or welded tubular construction, or various types of bars such as I-beams solid in cross-section, as the load-carrying member. In mass production, the tubular beams are usually preferred, incorporating, as they do, a minimum of material with a maximum of strength and rigidity.

While I-beams afford excellent resistance to vertical bending and good spring seat attachments, they are not designed to resist brake torque stresses and are heavy and relatively expensive, so that a lighter tubular beam employing less material but having equivalent or required strength and formed to resist braking torque is preferable, and the invention contemplates the manufacture of a suitably shaped tubular trailer or non-driving axle beam which is light and inexpensive and substantially equivalent to an I-beam in resistance to vertical bending.

However, many difficult practical problems are encountered in inexpensively producing a sturdy, light, tubular axle beam with a minimum number of machining and other forming operations, and this invention is directed toward their solution. A major problem which is present in making tubular axle beams arises from the necessity of attachment, by welding or other methods of spring pads or seats to the beam, to provide support and attachment for the vehicle suspension springs. Since spring pads so attached often present the sole means for preventing rotation of the tubular axle beam due to braking torque, it is preferable to provide a tubular axle beam which is non-circular, preferably substantially rectangular, in cross-section at the spring seats so as to provide positive seats for the vehicle springs, and further to incorporate strength, rigidity, and light weight. This result is accomplished practically by attaching a plurality of suitably formed longitudinal axle component members together by a longitudinal weld, according to the invention, as will be later described in more detail.

Tubular drive axle housings and methods of making them from longitudinally welded preformed housing lengths are disclosed in United States Letters Patents No. 1,108,114 to Alden and No. 2,204,287 to Wilber, and in my co-pending application Serial No. 552,507, filed September 2, 1944, entitled Axle Housing, of which the present is a continuation-in-part, issued September 6, 1947, as United States Letters Patent No. 2,480,833.

Trailer and non-drive axle tubular beams require different design considerations than the usual drive axle housings which, as illustrated in the above patents, are mainly of circular cross-section intermediate the spring seat regions. Since the primary function of a trailer axle, for example, is load carrying with required high resistance to vertical bending, such circular cross-section does not take full advantage of the amount of material used in the housing, and the present invention contemplates shaping the tubular trailer axle intermediate its spring seats for maximum resistance to vertical bending stress.

It is accordingly a major object of this invention to provide a novel, light, strong, inexpensive trailer or non-driving tubular axle beam having non-circular spring seats and an intermediate portion formed for maximum resistance to vertical bending stresses, and novel methods of fabricating the same.

Another object of the invention is to provide a novel tubular trailer or non-driving axle beam which is generally rectangular cross-section throughout but of changing cross-section intermediate a central load carrying portion and outer spring carrying portions of less depth than said intermediate portion.

It is a further object of this invention to provide a novel tubular axle beam of which the load-supporting portion is greater in its vertical dimension than its transverse horizontal dimension, and is generally rectangular in cross-section.

Still a further object of this invention is to provide a novel tubular axle beam so formed as to be adapted for strongly resisting vertical bending forces in its central or load-carrying portion, and for maximum opposition to torsional forces in its outer spring-seating portions.

Another object of this invention is the provision of a novel tubular trailer or non-driving axle beam, the component parts of which may be formed from suitable blanks and secured together permanently along longitudinal straight weld lines, and novel methods of fabricating the same.

Still another object of this invention resides in the manufacture of a plurality of forgings of equal width, adapted to form an axle beam, said forgings so adapted as to present adjacent surfaces for welding or other attachment which are in a straight line, thus allowing of a jointure with optimum strength, and permitting of the efficient use of multiple welding arcs or other high-speed production methods.

A further object of this invention is the provision of an axle beam the components of which may be manufactured by suitable forming operations from rectangular blanks of metal, said forming operations being so adapted as to utilize all of the metal in the blank without waste or poor distribution of metal, and novel methods of forming said components from the blanks.

A still further object of this invention is to provide a novel trailer or non-driving tubular axle beam with its outer portions stoved into substantially rectangular cross-section, and with the excess metal stored in thickened corners for said outer portions.

A further object of the invention is to provide a novel channeled component for a trailer or non-driving axle beam having generally rectangular cross-section and an intermediate portion of greater channel depth than the end portions with the open edges of the channel being straight throughout.

Another object of this invention is to provide a novel tubular trailer or non-driving axle beam so designed as to positively preclude the possibility of its rotation due to braking torque or other forces, when in assembly with its adjacent parts.

An additional object of this invention is the provision of a novel tubular axle beam comprising a plurality of longitudinally welded forgings, in which said forgings vary in their vertical dimension, but incorporate substantially unvarying transverse dimensions, both in regard to side wall thickness and overall width, so as to allow of a strong, easily made weld extending longitudinally of the forgings, to provide maximum resistance against vertical shear and compressive forces.

Further objects of the invention will become apparent as the description proceeds in conjunction with the appended claims and the accompanying drawings wherein:

Figure 1:
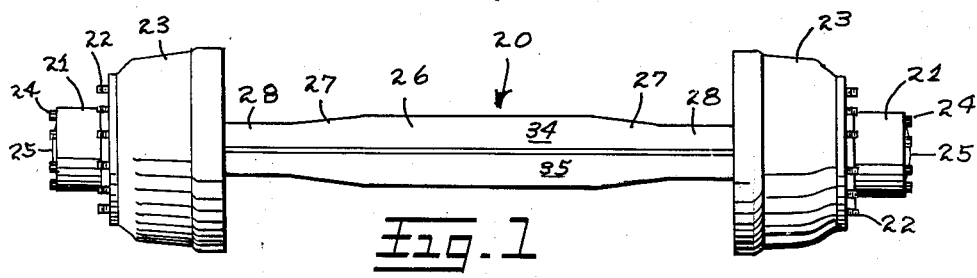
Figure 1 is a side elevational view of an improved non-driving trailer axle constructed according to the invention.

With continued reference to the drawings, in which like reference characters represent like parts throughout the several views thereof, and more particularly to Figure 1, the numeral 20 refers generally to the tubular axle beam of this invention as embodied in a typical trailer axle installation with the hubs 21 journalled on it in the conventional manner by means of suitable roller bearings (not shown). Studs 22 attach brake drums 23 to hubs 21 as well as serving as bolts for fastening the vehicle wheels (not shown) in place. Cap screws 24 attach end cover plate 25 to each hub 21. This embodiment of the tubular axle beam, consisting of load-supporting central portion 26, transition regions 27, and spring seat end portions 28, is secured at each end to similar axle end and spindle support members which also carry the brake spider 29 illustrated in Figure 2. Brake spider 29 is apertured at 30 to receive rivets (not shown) for fastening the brake shoe and cam-shaft brackets (not shown) in place. The inner portion 31 of the spider and spindle support member is preferably of substantially rectangular tubular cross-section corresponding precisely in cross-section to the adjacent extremity of spring seat portion 28 of beam 20, later to be described in detail, so as to form a flush butt-weld joint therewith of maximum strength. The outer or spindle portion 32 of the support member is circular in cross-section so as to provide seating for the wheel bearings (not shown).

Figure 2:
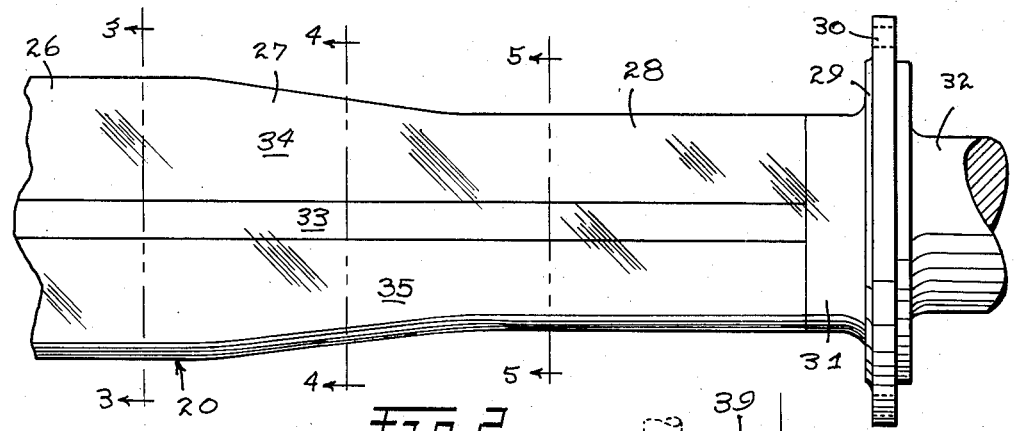
Figure 2 is an elevational view on an enlarged scale of one end, especially illustrating the spring-seating portion, of the improved axle of Figure 1.
Figures 3, 4, 5:
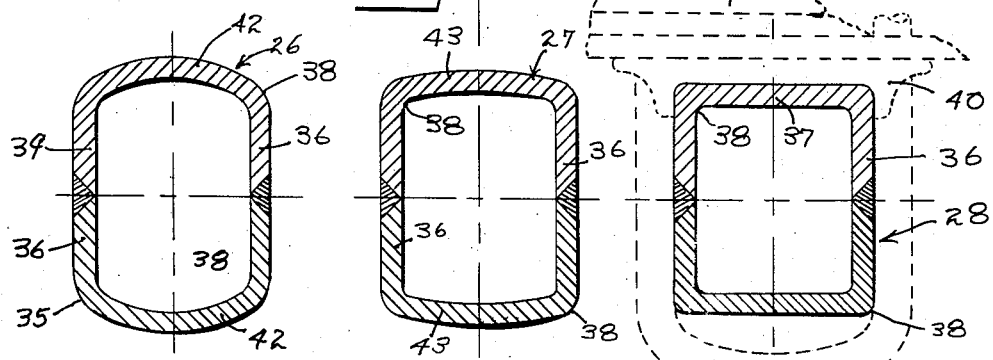
Figure 3 is a vertical section taken on line 3—3 of Figure 2, looking in the direction of the arrows.
Figure 4 is a vertical section taken on line 4—4 of Figure 2, looking in the direction of the arrows.
Figure 5 is a vertical section taken on line 5—5 of Figure 2, looking in the direction of the arrows, with the vehicle suspension spring and mounting shown in dotted lines.

As indicated in Figures 1 and 2, a longitudinal weld 33 joins the channeled, preferably identical preformed halves 34 and 35 of beam 20 together on each side, maximum strength being assured by the fact that the beam is of constant width throughout its entire length as illustrated in Figures 3, 4 and 5, so that the surfaces presented for welding are disposed in a straight, horizontal line.

The outer spring seat portion 28 of the beam is suitably formed into a shape substantially rectangular in cross-section with its vertical side faces 36 parallel to each other and normal to the horizontal upper and lower surfaces of walls 37. Radii as at 38 relieve strains which otherwise would be set up by forging operations, thus insuring strength and rigidity. The rectangular, preferably almost square, cross-section of beam 20 at the spring seat portion 28 is so designed as to present the maximum resistance against torsional forces engendered by braking and transmitted through spider 29 to the axle beam.

The vehicle spring 39 is mounted on a spring clip 40 seating over the top of the portion 28 of the beam, and is attached thereto by a U-bolt assembly 41 in a conventional manner.

The intermediate load-supporting portion 26 of beam 20 is also generally rectangular in cross-section with the upper and lower walls 42 suitably formed into an arcuate cross-section so that the vertical dimension of beam 20 over the entire load-carrying portion 26 is greater than that of the portion 28 and also greater than the width of the beam which, in overall dimensions, remains the same throughout its length. The construction of center portion 26 is thus highly adapted for carrying weight placed upon the axle and resisting vertical bending forces while utilizing a minimum of metal.

The transition regions 27 of the axle beam are also of generally rectangular cross-section at any given point along their length, with slightly arcuate upper and lower walls 43 as shown in Figure 4. The overall width remains the same, reduction in size taking place in the overall vertical dimension only. Walls 43 continuously change in curvature between the horizontal flat shape at 37 in the spring seat portions to the more arcuate shape at 42 in the intermediate portion.

Figure 6:
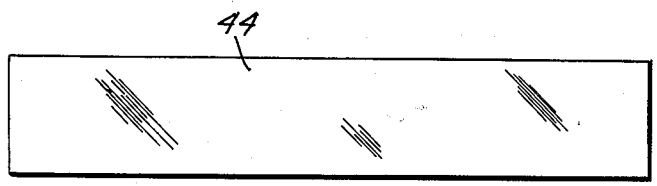
Figure 6 is a view in elevation of a rectangular blank of the type used in manufacturing each longitudinal component of the improved axle beam of Figure 1.
Figure 7:
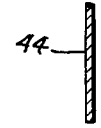
Figure 7 is a transverse section through the blank of Figure 6.

Each component half of beam 20 is preferably made by suitable forging operations upon a standard rectangular blank 44 of uniform metal thickness, illustrated in Figures 6 and 7. Blank 44 contains substantially the exact amount of metal which will be present in the produced component, excess metal being redistributed to provide the squared end portions of the component. The upper component half 34 is illustrated in Figures 8–12.

Figure 8:
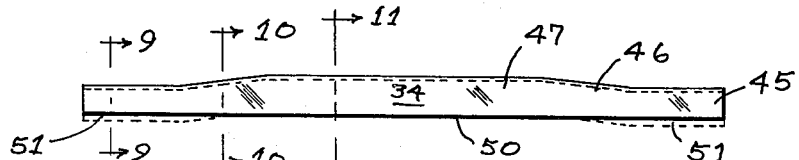
Figure 8 is a side elevational view of the finished forging formed from the blank of Figures 6 and 7, before attachment to a similar forging to form the axle beam of Figure 1.
Figures 9, 10, 11, 12:
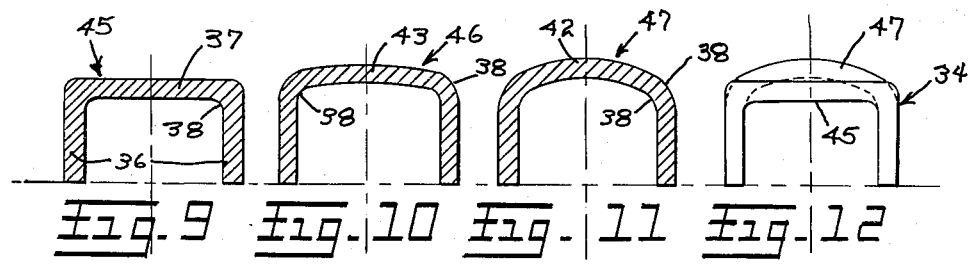
Figure 9 is a transverse sectional view taken along line 9—9 of Figure 8.
Figure 10 is a transverse sectional view taken on line 10—10 of Figure 8.
Figure 11 is a transverse sectional view taken along line 11—11 of Figure 8.
Figure 12 is an end elevational view of the forging of Figure 8.
Figure 13:
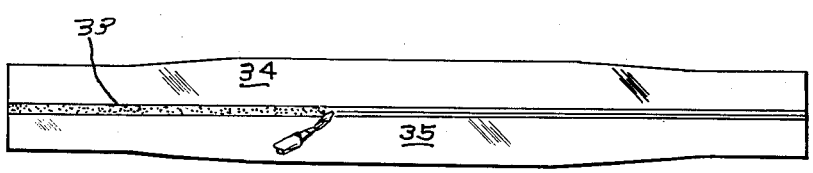
Figure 13 is an elevational view showing the position of the forgings during the longitudinal welding operation in making the axle beam of Figure 1.
Figure 14:
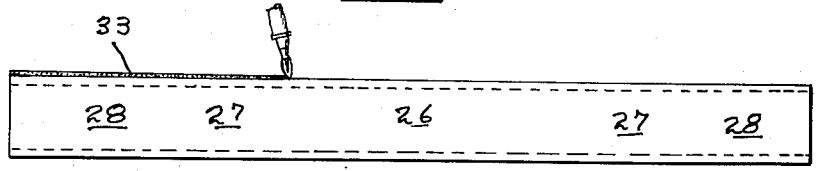
Figure 14 is a plan view of the forgings in the position for welding shown also in Figure 13.

Initially the blank is drawn and swaged into channeled shape, the end and transition portions 45 and 46 being deflected as indicated in dotted lines in Figure 8. The cross-section of the channel after initial forming operations may be as shown in Figure 11. Then, or simultaneously as available equipment or choice may dictate, the end portions are stoved into flat sided channel end sections 45 as illustrated in Figure 9 and having flat bottom wall 37 in the channel and radii 38 at the corners to relieve forging strains, and the transition regions 46 are stoved and drawn to provide bottom channel walls 43 which have constant taper longitudinally between walls 37 and 42 and gradually changing curvature at each transverse section between walls 37 and 42.

During these operations care is taken that the edges of the open end of the channel are formed and maintained parallel and straight so that straight weld lines 50 will be provided when the halves are welded together. The regions from which excess metal is obtained for forming the end and transition regions is indicated at 51 in Figure 8. This excess metal and metal from the flattened bottom channel walls is redistributed to provide the required thickened and reshaped end portions of the channel.

During the stoving operation the channel is held to constant length, the excess metal at the stoved end portions 28 chiefly going into the generally rectangular corners which are materially thicker in cross section than the channel walls as illustrated in Figures 5 and 9. It is probable that the channel walls in the end and transition portions may be thickened somewhat as a result of the stoving operation although they are also probably drawn to some extent near the corners, but this is not particularly material to the invention which is chiefly concerned with the forming of the strengthened rectangular corners for obtaining spring seats of adequate characteristics.

In order to maintain constant length of the channel, the ends are held, and suitable dies prevent changes in width of the channel. The channel is supported open side up, so held against change in length and width, and stoved by vertical pressure exerted downwardly on the upstanding side-walls. The excess metal resulting from the reduced vertical dimension and flattened bottom of the channel at the end portions goes mainly into the squared corners which are considerably thickened.

If necessary, intermediate portion 47 may be drawn further to further increase its vertical dimention as desired while preserving its width, but such need not be done if the initial operations produce the required shape of Figure 11.

Relieving radii 38 of course become of constantly increasing curvature between portions 45 and 47.

The sequence of operations in forming each component half of the axle beam of the invention is not critical, depending usually on the equipment and technique available. It is essential only that once the channel is formed it be held to constant length and width as closely as possible during the stoving, forging, stamping or other forming operations shaping the spring seat and transition portions.

As illustrated in Figure 12, the transverse horizontal dimension does not vary the length of each half of beam 20.

For the welding operation (which is not limited to use of the single arc shown here for clarity), a pair of channeled members 34 and 35, formed as above described and having their open edges beveled to correspond to the similar portions in Figures 3–5, are placed in juxta-position in suitable jigs, and a single linear traverse of the welding arc is made on each side. This method, permitted by the complementary width, constant wall thickness, straight line jointure of the channeled members, allows of the use of simple automatic equipment for high speed production, and furthermore results in a weld of maximum strength.

While the invention has been described as embodying a butt-welded spindle wheel mounting at 31, it may be easily adapted with minor changes to use inserted sleeve type disclosed in my said application Serial No. 552,507.

According to the invention as above described I have thus provided a tubular trailer or other non-driving axle beam which is formed at its ends with substantially rectangular spring seat portions affording maximum resistance to turning of the beam in response to brake torque forces, and formed intermediate those spring seat portions to have maximum resistance to bending due to weight carried by the axle. The axle and its method of assembly including straight line horizontal welding of the upper and lower channeled halves and butt-welding of the wheel spindle supports affords a novel and inexpensive manner of providing a trailer or non-driving axle of minimum cost in material and labor, maximum strength under all operational conditions, and clean substantial external appearance.

The novel method of forming each half of the beam eliminates waste by using all of the metal in the blank, and since the two formed halves are bonded along a weld-line which is generally normal to the usual vertical bending stresses to which the axle is mainly subjected, the axle beam is of great strength under all operational conditions. The invention contemplates making and selling individual formed beam halves for use in assembling axles of this type, and for rebuilding damaged axles.

The operations above described for forming the components of the axle beam may be transposed or varied as desired, without altering the essential method and structure of the invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are intended to be embraced therein.

What is claimed and desired to be secured by United States Letters Patent is:

1. A hollow open ended tubular axle beam comprising a substantially constant width generally rectangular member made from similar upper and lower channeled components joined along parallel straight edges at opposite sides of the beam and having similar end portions formed with substantially squared and thickened corners, an intermediate portion and transition portions between said intermediate and end portions, said intermediate portion having a greater overall vertical dimension than said end portions, and said transition portions being of gradually changing shape and size between said intermediate and end portions.

2. An axle embodying the beam defined in claim 1, and including wheel spindle mountings each having an inner abutment section shaped similarly to the adjacent axle beam end and butt welded thereto.

3. In an axle assembly, a tubular axle beam of generally rectangular section and substantially constant width throughout its length and comprising upper and lower similar channel members joined along parellel straight edges at opposite sides of the beam, said beam having parallel straight side walls throughout the length of said beam, wheel spindle members secured to opposite ends of said beam, each spindle member comprising an inner abutment section shaped similarly to the adjacent axle beam end and butt welded thereto.

4. A through axle structure comprising a constant width hollow member having end portions of substantially rectangular cross section, a central portion of materially greater depth than said end portions and being of substantially rectangular cross section with arcuate top and bottom walls, and merging integral transition portions between said intermediate portion and said end portions, each of said end portions including a spring seat region having flat top and bottom walls and substantially square corners at the junction of these walls with the adjacent side walls of said member, these corners being materially thicker than the adjacent walls of said member, and said transition portions being of changing depth between said intermediate and end portions and having top and bottom walls of gradually changing contour between said intermediate and end portions.

5. The axle structure defined in claim 4 wherein said member comprises two similar opposed channels welded together in a straight line along contacting mating side wall edges from end to end of said member.

6. A longitudinal tubular non-driving axle beam comprising a pair of opposed generally semi-rectangular, substantially constant width channel members each having straight parallel side walls throughout its length with said side walls being joined along mating edges at opposite sides of the beam, said beam comprising similar spring attachment portions at opposite ends of the beam having flat top and bottom walls and substantially squared and thickened corners at the junctions of said side walls and said flat top and bottom walls, an intermediate beam portion having a depth greater than said end portions, and transition portions of gradually changing cross-section between said intermediate and end portions, and the mating side wall edges of said channel members being straight throughout the length of said beam.

References Cited in the file of this patent

UNITED STATES PATENTS

| Number | Name | Date |
| --- | --- | --- |
| 463,621 | Curtis | Nov. 24, 1891 |
| 1,219,153 | Reissner | Mar. 13, 1917 |
| 1,690,511 | Urschel | Nov. 6, 1928 |
| 1,841,735 | Hufferd et al. | Jan. 19, 1932 |
| 1,899,347 | Mogford | Feb. 28, 1933 |
| 1,945,092 | Storer | Jan. 30, 1934 |
| 2,148,714 | Urschel | Feb. 28, 1939 |
| 2,170,522 | Voorhees | Aug. 22, 1939 |
| 2,218,127 | Urschel | Oct. 15, 1940 |
| 2,227,436 | Buckwalter | Jan. 7, 1941 |

FOREIGN PATENTS

| Number | Country | Date |
| --- | --- | --- |
| 289,684 | Great Britain | May 3, 1928 |